United States Patent
Chang et al.

(10) Patent No.: US 9,377,647 B2
(45) Date of Patent: Jun. 28, 2016

(54) STEREOSCOPIC TOUCH DISPLAY DEVICE

(71) Applicant: AU OPTRONICS CORP., Hsinchu (TW)

(72) Inventors: Chi-Ho Chang, Hsin-Chu (TW);
Chien-Chieh Yang, Hsin-Chu (TW);
Wen-Yuan Li, Hsin-Chu (TW);
Shiuan-Iou Lin, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 287 days.

(21) Appl. No.: 14/284,822

(22) Filed: May 22, 2014

(65) Prior Publication Data
US 2015/0168761 A1 Jun. 18, 2015

(30) Foreign Application Priority Data
Dec. 17, 2013 (TW) .............................. 102146675 A

(51) Int. Cl.
*G02F 1/1335* (2006.01)
*G02F 1/1333* (2006.01)
*G02B 27/22* (2006.01)
*H04N 13/04* (2006.01)

(52) U.S. Cl.
CPC ........ *G02F 1/13338* (2013.01); *G02B 27/2214* (2013.01); *H04N 13/0402* (2013.01)

(58) Field of Classification Search
None
See application file for complete search history.

(56) References Cited

U.S. PATENT DOCUMENTS

| | | | |
|---|---|---|---|
| 2004/0041747 A1 | 3/2004 | Uehara et al. | |
| 2009/0185088 A1 | 7/2009 | Shinohara | |
| 2011/0267293 A1 | 11/2011 | Noguchi et al. | |
| 2012/0169648 A1 | 7/2012 | Luo | |
| 2013/0148043 A1 | 6/2013 | Ohyama | |
| 2013/0300705 A1 | 11/2013 | Goo et al. | |
| 2013/0314624 A1 | 11/2013 | Li et al. | |
| 2014/0375905 A1 | 12/2014 | Chang et al. | |

FOREIGN PATENT DOCUMENTS

| | | |
|---|---|---|
| CN | 102156565 A | 8/2011 |
| CN | 103389602 A | 11/2013 |
| CN | 103399438 | 11/2013 |
| TW | 201211852 | 3/2012 |
| TW | 201323931 | 6/2013 |
| TW | 201348798 | 12/2013 |

*Primary Examiner* — Richard Kim
(74) *Attorney, Agent, or Firm* — WPAT, PC; Justin King

(57) ABSTRACT

A stereoscopic touch display device includes a display panel and a stereoscopic touch panel. The stereoscopic touch panel includes a first substrate, a second substrate, a liquid crystal layer, receiver electrodes, transmitter electrodes, common electrodes, a signal driver, and a common potential providing unit. The liquid crystal layer is disposed between the first and second substrates. The receiver electrodes and the common electrodes are disposed on the first substrate. The transmitter electrodes are disposed on the second substrate. The signal driver is electrically connected to the transmitter electrodes and the receiver electrodes. The signal driver is configured for providing transmitting touch signals to the transmitter electrodes and detecting receiving touch signals generated from coupling capacitances between the receiver electrodes and the transmitter electrodes in sequence. Each of the transmitting touch signals is configured so as to be unable to trigger liquid crystal molecules of the liquid crystal layer.

19 Claims, 15 Drawing Sheets

STEREOSCOPIC TOUCH DISPLAY DEVICE

RELATED APPLICATIONS

This application claims priority to Taiwan Application Serial Number 102146675, filed Dec. 17, 2013, which is herein incorporated by reference.

BACKGROUND

1. Field of Invention

The present invention relates to a stereoscopic touch display device.

2. Description of Related Art

With a typical touch display panel, a touch signal detecting structure is usually disposed near a signal source (e.g., fingers) for reducing a noise ratio of the touch signals and thereby obtaining a better quality of the touch signals. In order to present planar and stereoscopic images on an in-cell touch display panel, a 2D/3D switch structure is generally installed on the in-cell touch display panel. However, due to the distance between the touch signal detecting structure and the signal source, that is, the source that causes variations in coupling capacitance, being too far as a result of being spaced apart by a liquid crystal panel, and moreover, due to noise from the 2D/3D switch structure, the in-cell touch display panel may lose its touch function. In addition, if an on-cell touch panel is used, this may increase overall thickness and weight.

SUMMARY

An aspect of the invention provides a stereoscopic touch display device. The stereoscopic touch display includes a display panel and a stereoscopic touch panel. The display panel includes plural pixel units. The stereoscopic touch panel includes a first substrate, a second substrate, a liquid crystal layer, plural receiver electrodes, plural transmitter electrodes, plural common electrodes, a signal driver, and a common potential providing unit. The second substrate is disposed opposite to the first substrate, and the liquid crystal layer is disposed between the first substrate and the second substrate. The receiver electrodes and the common electrodes are disposed on the first substrate, and the transmitter electrodes are disposed on the second substrate. The signal driver is electrically connected to the transmitter electrodes and the receiver electrodes. The signal driver is configured for providing the transmitting touch signals to at least one portion of the transmitter electrodes, and detecting the receiving touch signals generated from coupling capacitances between the receiver electrodes and at least one portion of the transmitter electrodes in sequence. Each of the transmitting touch signals is configured so as to be unable to trigger the liquid crystal molecules of the liquid crystal layer. The common potential providing unit is used for providing a common potential to at least one portion of the common electrodes.

The stereoscopic touch display device described in the above embodiment can provide a touch function and a stereoscopic display function simultaneously by the disposition of the receiver electrodes, the transmitter electrodes, and the common electrodes. The thickness and weight of the stereoscopic touch display device can be reduced, and transmittance can be enhanced.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
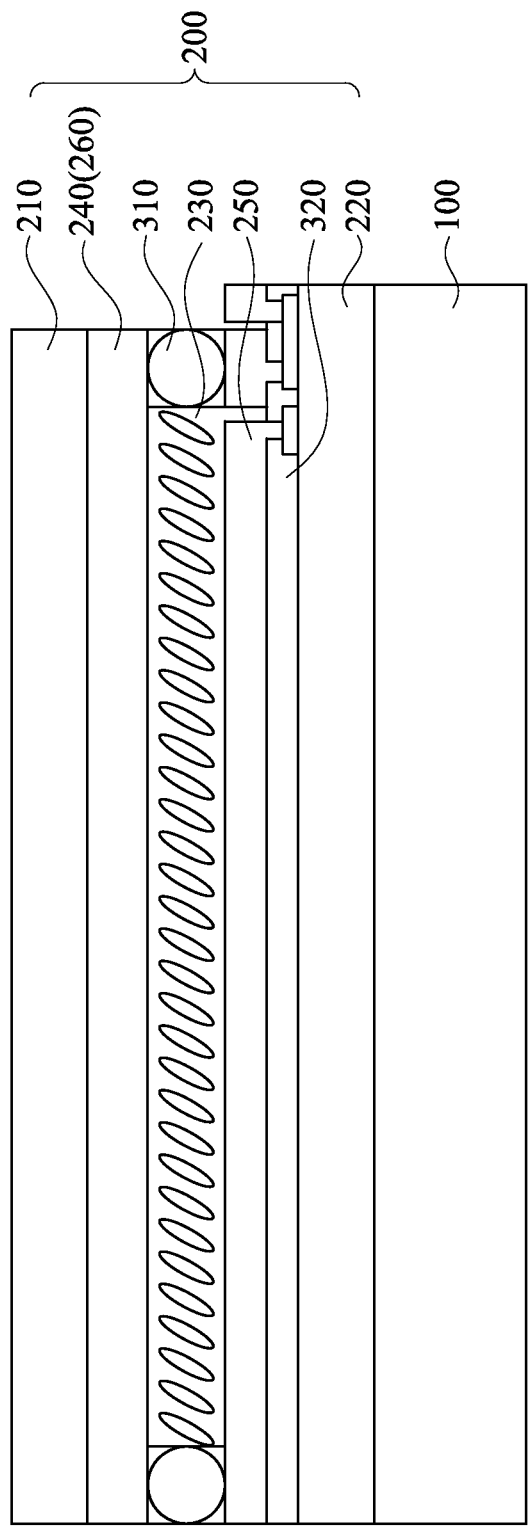
FIG. 1 is a cross-sectional view of a stereoscopic touch display device according to a first embodiment of this invention.

Reference will now be made in detail to the embodiments of the present invention, examples of which are illustrated in the accompanying drawings. Wherever possible, the same reference numbers are used in the drawings and the description to refer to the same or like parts.

FIG. 1 is a cross-sectional view of a stereoscopic touch display device according to a first embodiment of this invention. The stereoscopic touch display device includes a display panel 100 and a stereoscopic touch panel 200. The display panel 100 includes plural pixel units. The stereoscopic touch panel 200 includes a first substrate 210, a second substrate 220, a liquid crystal layer 230, multiple receiver electrodes 240, multiple transmitter electrodes 250, and multiple common electrodes 260. The second substrate 220 is disposed opposite to the first substrate 210. The liquid crystal layer 230 is disposed between the first substrate 210 and the second substrate 220. The receiver electrodes 240 and the common electrodes 260 are both disposed on the first substrate 210, and the transmitter electrodes 250 are disposed on the second substrate 220.

Figure 2:
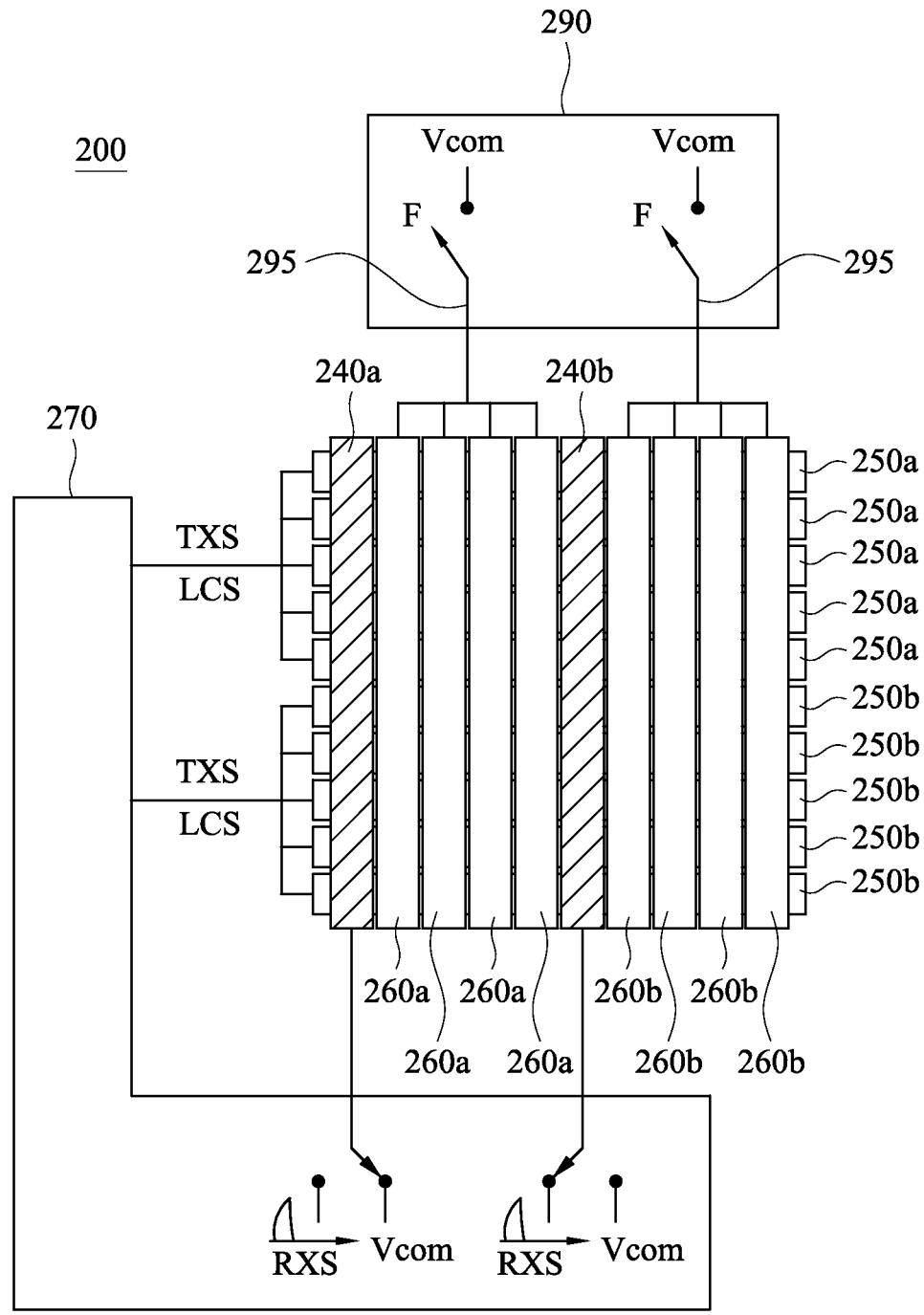
FIG. 2 is a top view of a stereoscopic touch panel of FIG. 1.

FIG. 2 is a top view of the stereoscopic touch panel 200 of FIG. 1 according to one embodiment of this invention. It is noted that though FIG. 2 is illustrated with ten transmitter electrodes (five transmitter electrodes 250*a* and five transmitter electrodes 250*b*), two receiver electrodes (one receiver electrode 240*a* and one receiver electrode 240*b*), and eight common electrodes (four common electrodes 260*a* and four common electrodes 260*b*), such details are not intended to limit the present invention. The stereoscopic touch panel 200 further includes a signal driver 270 and a common potential providing unit 290. The signal driver 270 is electrically connected to the transmitter electrodes. For example, as shown in FIG. 2, the signal driver 270 is electrically connected to the transmitter electrodes 250*a* and 250*b*. The signal driver 270 is configured for providing plural transmitting touch signals TXS, which are driven by high frequencies, to the transmitter electrodes 250*a* and 250*b*. Each of the transmitting touch signals TXS is unable to trigger the liquid crystal molecules of the liquid crystal layer 230. To be more precise, each of the transmitting touch signals TXS has a frequency which is higher than a reciprocal of the response time of the liquid crystal molecules, e.g., the period of the transmitting touch signals TXS is shorter than the response time of the liquid crystal molecules, and each of the transmitting touch signals TXS has the same potential difference, so that the liquid crystal molecules are not rotated to produce a brightness variation that is visible to the human eyes. The signal driver 270 is electrically connected to the receiver electrodes. For example, as shown in FIG. 2, the signal driver 270 is electrically connected to the receiver electrodes 240*a* and 240*b*. The signal driver 270 is configured for detecting plural receiving touch signals RXS generated from the coupling capacitances between the receiver electrodes 240*a*, 240*b* and the transmitter electrodes 250*a*, 250*b*. The common potential providing unit 290 is used for providing a common potential Vcom to a portion of the common electrodes. For example, as shown in the FIG. 2, the common potential providing unit 290 is used for providing the common potential Vcom to the common electrodes 260*a* and 260*b*.

Reference is now made back to FIG. 1. With the structural configuration described above, both a stereoscopic display function and a touch function can be realized through the receiver electrodes 240, the transmitter electrodes 250, and the common electrodes 260. Since a user views the stereoscopic touch display device in a direction from the stereoscopic touch panel 200 toward the display panel 100, a signal source (fingers of the user, for example) that causes a change in coupling capacitances is outside the first substrate 210 of the stereoscopic touch panel 200. The coupling capacitances may be changed corresponding to whether or not touch is being performed and this further changes the receiving touch signals RXS (as shown in FIG. 2). Therefore, the distance between the receiver electrodes 240 and the signal source is shortened, such that the stereoscopic touch panel 200 has a better capability to detect the signal source. Moreover, the receiver electrodes 240 and the common electrodes 260 can be formed in an electrode layer, and the transmitter electrodes 250 can be formed in another electrode layer. In other words, the stereoscopic display function and the touch function of the stereoscopic touch panel 200 of this invention can be realized using two electrode layers, and such a configuration can reduce the thickness of the stereoscopic touch panel 200 and enhance transmittance of the same.

Each of the transmitting touch signals TXS (as shown in FIG. 2) is unable to trigger and rotate the liquid crystal molecules of the liquid crystal layer 230 to produce brightness variations visible to the human eyes. As a result, when one or more of the transmitter electrodes receive the transmitting touch signals TXS (the transmitting touch signals TXS are in a touch state herein), the transmitting touch signals TXS are prevented from interfering with the stereoscopic display function of the stereoscopic touch panel 200. For example, the frequency of each of the transmitting touch signals TXS may be sufficiently high so that rotation of the liquid crystal molecules of the liquid crystal layer 230 does not occur, and hence, the liquid crystal molecules are not rotated to produce brightness variations that are visible to the human eyes. As a result, though the signal driver 270 (as shown in FIG. 2) provides the transmitting touch signals TXS to the transmitter electrodes 250, the transmitting touch signals TXS do not affect the images of the stereoscopic touch display device.

Figure 3:
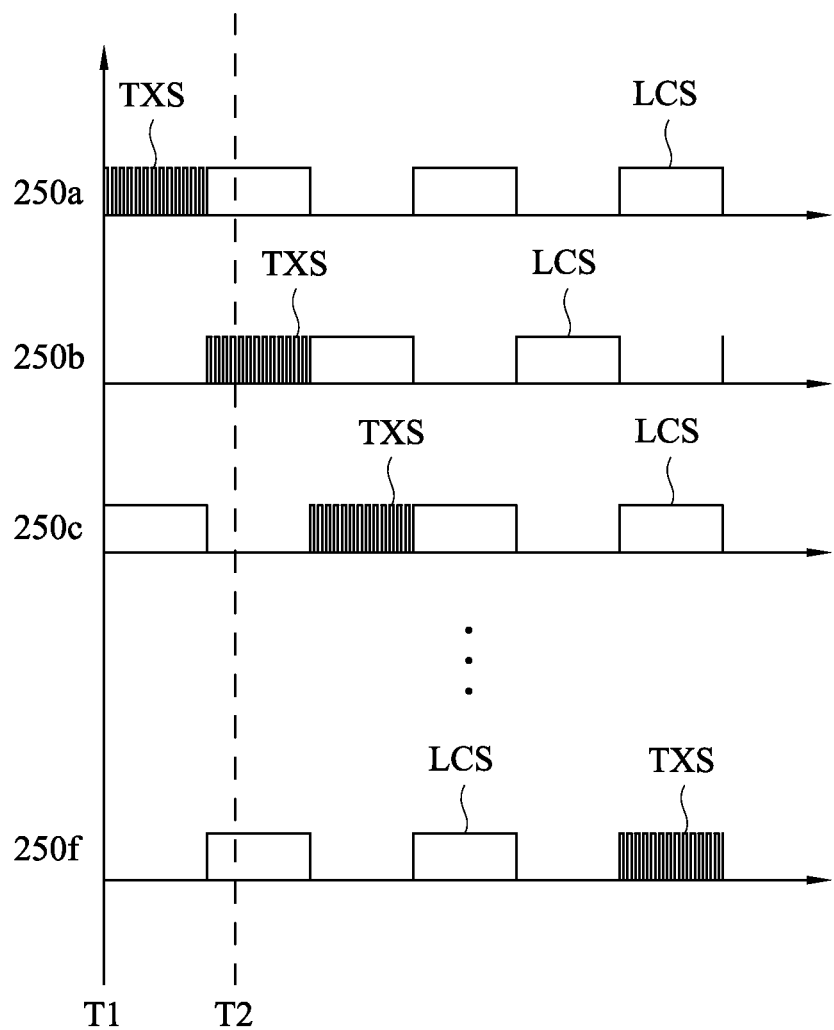
FIG. 3 is a signal diagram of transmitter electrodes of FIG. 2 in a state of performing stereoscopic display.

Reference is now made to both FIG. 2 and FIG. 3, in which FIG. 3 is a signal diagram of the transmitter electrodes of FIG. 2 in a state of performing stereoscopic display. The stereoscopic display function and the touch function of the stereoscopic touch panel 200 are discussed individually. The stereoscopic display function is first discussed. In this embodiment, the signal driver 270 is used for providing plural liquid crystal driving signals to at least one portion of transmitter electrodes respectively and controlling the rotation of liquid crystal molecules, so that plural images displayed by plural pixel units are guided to plural fields of view respectively. Furthermore, when the stereoscopic touch panel 200 is in the stereoscopic display state, the signal driver 270 provides the common potential Vcom to the receiver electrodes 240*a* and 240*b*, and the common potential providing unit 290 provides the common potential Vcom to the common electrodes 260*a* and 260*b*. In other words, when the stereoscopic touch panel 200 is in the stereoscopic display state, the receiver electrodes 240*a*, 240*b* and the common electrodes 260*a*, 260*b* are at the same potential. Moreover, the signal driver 270 provides the liquid crystal drive signals LCS to the transmitter electrodes 250*a* and 250*b* respectively, which generates electric fields in the liquid crystal layer with the receiver electrodes 240*a*, 240*b* and the common electrodes 260*a*, 260*b*. Thus, the liquid crystal molecules in the liquid crystal layer 230 are driven to rotate. The liquid crystal drive signals LCS can be a periodic square waveform. However, it should be understood that these details are not intended to limit the present invention. By designing the liquid crystal drive signals LCS between different transmitter electrodes, the liquid crystal layer 230 can have a refractive index distribution to simulate a refractive index distribution of a solid lens, so that a stereoscopic display can be realized. It is noted that the liquid crystal drive signals LCS received by transmitter electrodes 250*a* and 250*b* are out of phase in the same time domain in this embodiment. However, it should be understood that these details are not intended to limit the present invention. In other embodiments, the liquid crystal drive signals LCS received by transmitter electrodes 250*a* and 250*b* can be in phase.

In this embodiment, a frequency of each of the transmitting touch signals is higher than a frequency of each of the liquid crystal drive signals, and the transmitting touch signals TXS and the liquid crystal drive signals LCS both have the same potential difference. The rotations of the liquid crystal molecules have a relationship with the potential difference between two sides of the liquid crystal molecules and the corresponding response time of liquid crystal. For example, a signal can result in an instant potential difference between the two sides of the liquid crystal molecules, in which a potential with a higher frequency causes the rotation of the liquid crystal molecules to be less affected to produce visible brightness variation. As a result, choosing the transmitting touch signals TXS with a high frequency and the liquid crystal drive signals LCS with a low frequency can keep the liquid crystal molecules that are rotated by the liquid crystal drive signals LCS from being rotated by an instant potential difference of the transmitting touch signals TXS caused by finger touch actions. As a result, the liquid crystal molecules can be prevented from producing visible brightness variations. Therefore, the transmitting touch signals TXS have little influence on the performance of the stereoscopic display function of the stereoscopic touch panel 200.

The discussion will now turn to the touch function of the stereoscopic touch panel 200 in the stereoscopic display state. Specifically, the signal driver 270 is configured for providing the transmitting touch signals TXS to the transmitter electrodes 250a and 250b. Referring to FIG. 3, the signal driver 270 can first provide the transmitting touch signals TXS to the transmitter electrodes 250a, and at this time the signal driver 270 stops providing the liquid crystal drive signals LCS to the transmitter electrodes 250a, but provides the liquid crystal drive signals LCS to other transmitter electrodes (for example, the transmitter electrodes 250b). It should be noted that the liquid crystal drive signals LCS are a square wave function in this embodiment, and thus the liquid crystal drive signals LCS transmitted to the transmitter electrodes 250b are at a low potential. After provision of the transmitting touch signals TXS is finished, the signal driver 270 provides the liquid crystal drive signals LCS to the transmitter electrodes 250a again. Next, the signal driver 270 provides the liquid crystal drive signals LCS to the transmitter electrodes 250b, and at this time the signal driver 270 stops providing the liquid crystal drive signals LCS to the transmitter electrodes 250b, but provides the liquid crystal drive signals LCS to other transmitter electrodes (for example, the transmitter electrodes 250a). If the stereoscopic touch panel 200 includes other transmitter electrodes (for example, transmitter electrodes 250c to 250f shown in FIG. 3), the signal driver 270 can be configured for providing the transmitting touch signals TXS to the transmitter electrodes 250c to 250f following the above steps. Subsequently, the transmitter electrodes to which the transmitting touch signals TXS are not transmitted receive the liquid crystal drive signals LCS.

In this embodiment, although each of the transmitting touch signals TXS has the same period as a half period of the liquid crystal drive signals LCS, this invention is not limited in this respect. In another embodiment, the period of the transmitting touch signals TXS can be shorter or longer than the half period of the liquid crystal drive signals LCS, and such features are included in the scope of this invention.

Reference is made again to FIG. 2. In this embodiment, the stereoscopic touch panel 200 includes a switch 295. The switch 295 is used for disconnecting the electrical connection between the common electrodes and the common potential providing unit 290 when detecting at least one receiving touch signal RXS of the receiver electrodes, in which the common electrodes are at two sides of the receiver electrodes detecting the receiving touch signals RXS. Therefore, the common electrodes have a floating potential F. For example, in the configuration of FIG. 2, the signal driver 270 can first provide the transmitting touch signals TXS to the transmitter electrodes 250a, the liquid crystal drive signals LCS to the transmitter electrodes 250b, and common potential Vcom to the receiver electrodes 240a, and meanwhile detect the receiving touch signals RXS of the receiver electrodes 240b. The switch 295 disconnects the electrical connection between the common electrodes 260a, 260b and the common potential providing unit 290, such that the common electrodes 260a and 260b have the floating potential F. As a result, the electromagnetic force of the transmitter electrodes 250a can reach the common potential 260a and 260b, and produce coupling capacitances with the receiver electrodes 240b, in which the electromagnetic force is generated by the transmitting touch signals TXS. Thus, the signal driver 270 can determine whether the signal source is on top of the overlapping area of the transmitter electrodes 250a and the receiver electrodes 240b by detecting the receiving touch signals RXS generated from the coupling capacitances at the receiver electrodes 240b.

Figure 4:
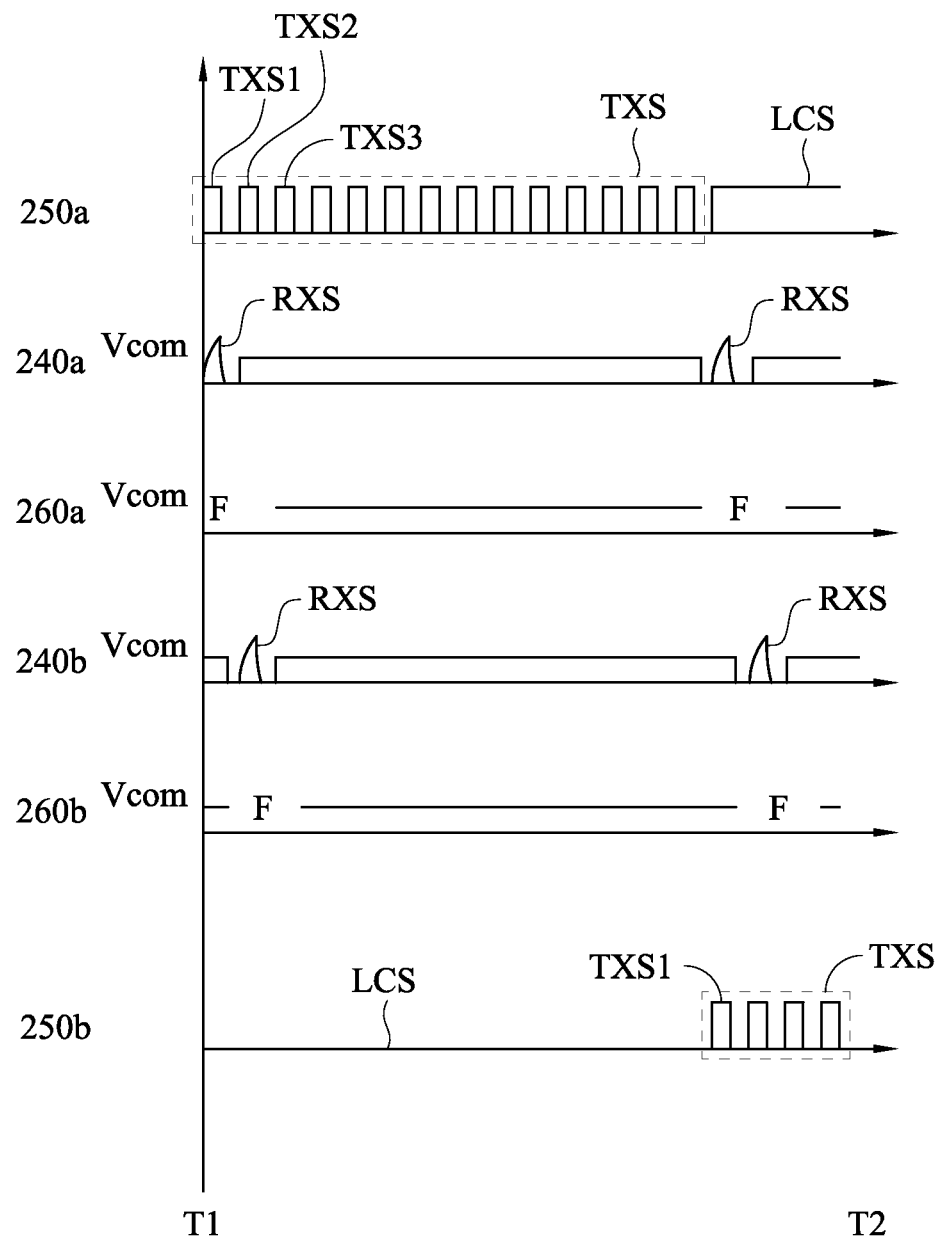
FIG. 4 is a signal diagram of receiver electrodes, common electrodes, and the transmitter electrodes of FIG. 2 in a time domain between T1 and T1 in FIG. 3.

Reference is now made to both FIG. 2 and FIG. 4, in which FIG. 4 is a signal diagram of the transmitter electrodes, the receiver electrodes, and the common electrodes of FIG. 2 in the time domain between T1 and T2 in FIG. 3. In any particular time domain, the signal driver 270 provides the transmitting touch signals TXS to the transmitter electrodes 250a, and the liquid crystal drive signals LCS to the receiver electrodes 240b, in which the transmitting touch signals TXS includes plural pulse signals TXS1, TXS2, TXS3, etc., and the liquid crystal drive signals LCS are at a low potential. When the pulse signal TXS1 is transmitted to the transmitter electrodes 250a, the signal driver 270 provides the common potential Vcom to the receiver electrodes 240b, and detects the signal of the receiver electrodes 240a at the same time. The switch 295 disconnect the electrical connection between the common electrodes 260a and the common potential providing unit 290, while the common potential providing unit 290 still provides the common potential Vcom to the receiver electrodes 260b. Therefore, the transmitter electrodes 250a have an electromagnetic force produced by the pulse signal TXS1, and the electromagnetic force can pass through the common potential 260a. At this time the signal driver 270 can detect the receiving touch signal RXS at the receiver electrodes 240a, and the receiving touch signal RXS is generated from the coupling capacitances between the transmitter electrodes 250a and the receiver electrodes 240a.

Next, the pulse signal TXS2 is transmitted to the transmitter electrodes 250a, so that the signal driver 270 provides the common potential Vcom to the receiver electrodes 240a and detects the signals of the receiver electrodes 240b. The switch 295 disconnects the electrical connection between the common electrodes 260a, 260b and the common potential providing unit 290. As a result, the electromagnetic force of the transmitter electrodes 250a can pass through the common potential 260a and 260b, and the electromagnetic force is produced by the pulse signal TXS2. At this time the signal driver 270 can detect the receiving touch signal RXS generated at the receiver electrodes 240b from the coupling capacitances between the transmitter electrodes 250a and the receiver electrodes 240b.

If the stereoscopic touch panel 200 further includes other receiver electrodes, the signal driver 270 can be configured for providing the pulse signals TXS3, etc., to the transmitter electrodes 250a according to the above steps and detecting the signals of the receiver electrodes. The switch 295 is configured for disconnecting the electrical connection between the common electrodes and the common potential providing unit 290, in which the common electrodes are at two sides of the receiver electrodes detecting the receiving touch signals RXS. As for the receiver electrodes that do not detect the receiving touch signals RXS, the receiver electrodes and other common electrodes are all kept at the common potential Vcom.

After the signal driver 270 is configured for detecting the signals of the receiver electrodes, the signal driver 270 turns to provide the liquid crystal drive signals LCS to the transmitter electrodes 250a, and then the signal driver 270 provides the transmitting touch signals TXS to the transmitter electrodes 250b. At first, the pulse signal TXS1 is transmitted to the transmitter electrodes 250b, and therefore, the signal driver 270 provides the common potential Vcom to the receiver electrodes 240b and detects the signal of the receiver electrodes 240a. The switch 295 disconnects the electrical connection between the common electrodes 260a and the common potential providing unit 290, while the common potential providing unit 290 provides the common potential Vcom to the common electrodes 260b. As a result, the electromagnetic force of the transmitter electrodes 250b can pass through the common potential 260a, and the electromagnetic force is produced by the pulse signals TXS1. At this time the signal driver 270 can detect the receiving touch signal RXS at the receiver electrodes 240a, and the receiving touch signal RXS is generated from the coupling capacitances between the transmitter electrodes 250b and the receiver electrodes 240a. Subsequently, by repeating the above steps, both the stereoscopic display function and the touch function can be performed by the stereoscopic touch panel 200 in this embodiment.

Figure 5:
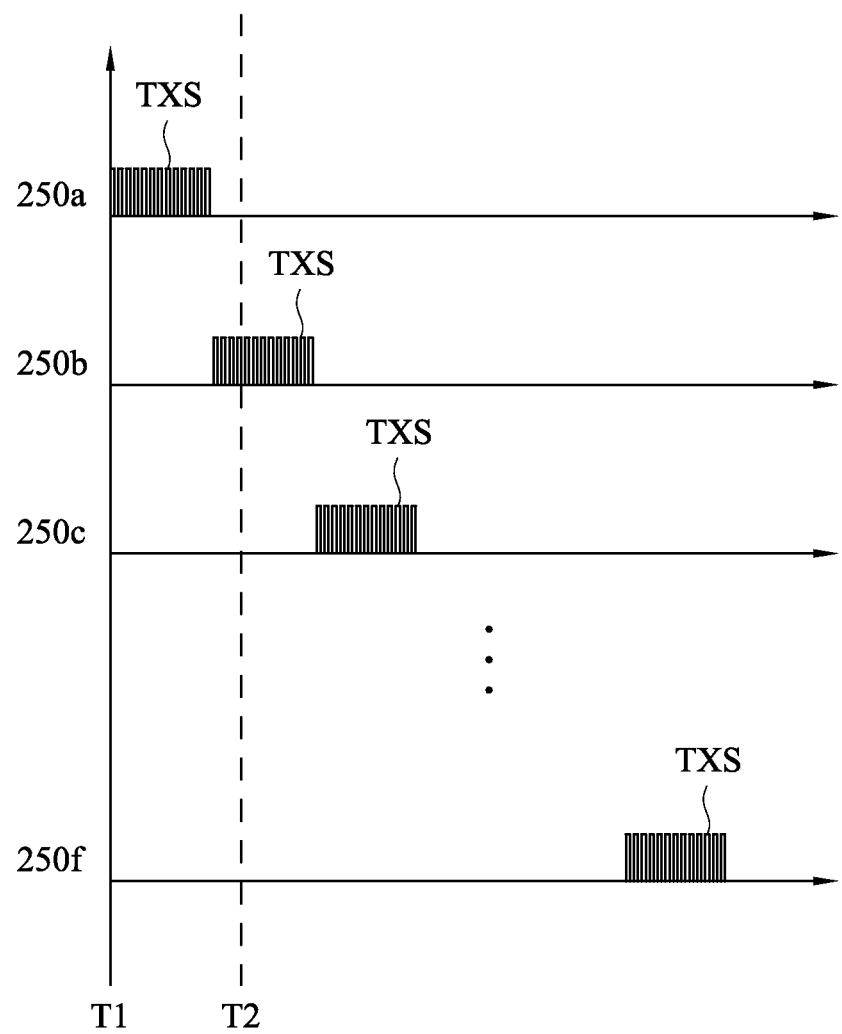
FIG. 5 is a signal diagram of the transmitter electrodes of FIG. 2 in a state of performing 2D display.

In one or more embodiment, the stereoscopic touch panel 200 switched to a 2D display state can also perform the touch function. Reference is now made to both FIG. 2 and FIG. 5, in which FIG. 5 is a signal diagram of the transmitter electrodes of FIG. 2 in a state of performing 2D display. Specifically, the signal driver 270 is configured for providing the transmitting touch signals TXS to the transmitter electrodes 250a and 250b. In FIG. 5, the signal driver 270 can provide the transmitting touch signals TXS to the transmitter electrodes 250a and provide a ground potential to the transmitter electrodes 250b. After the transmitting touch signals TXS are sent, the signal driver 270 provides a ground potential to the transmitter electrodes 250a. Subsequently, the signal driver 270 provides the transmitting touch signals TXS to the transmitter electrodes 250b and provides a ground potential to other transmitter electrodes (for example, the transmitter electrodes 250a). If the stereoscopic touch panel 200 further includes other transmitter electrodes (for example, transmitter electrodes 250c to 250f indicated in FIG. 5), the signal driver 270 can be configured for providing the transmitting touch signals TXS to the transmitter electrodes 250c to 250f in the manner described in the above steps, while the transmitter electrodes that do not receive the transmitting touch signals TXS stay at the ground potential.

Figure 6:
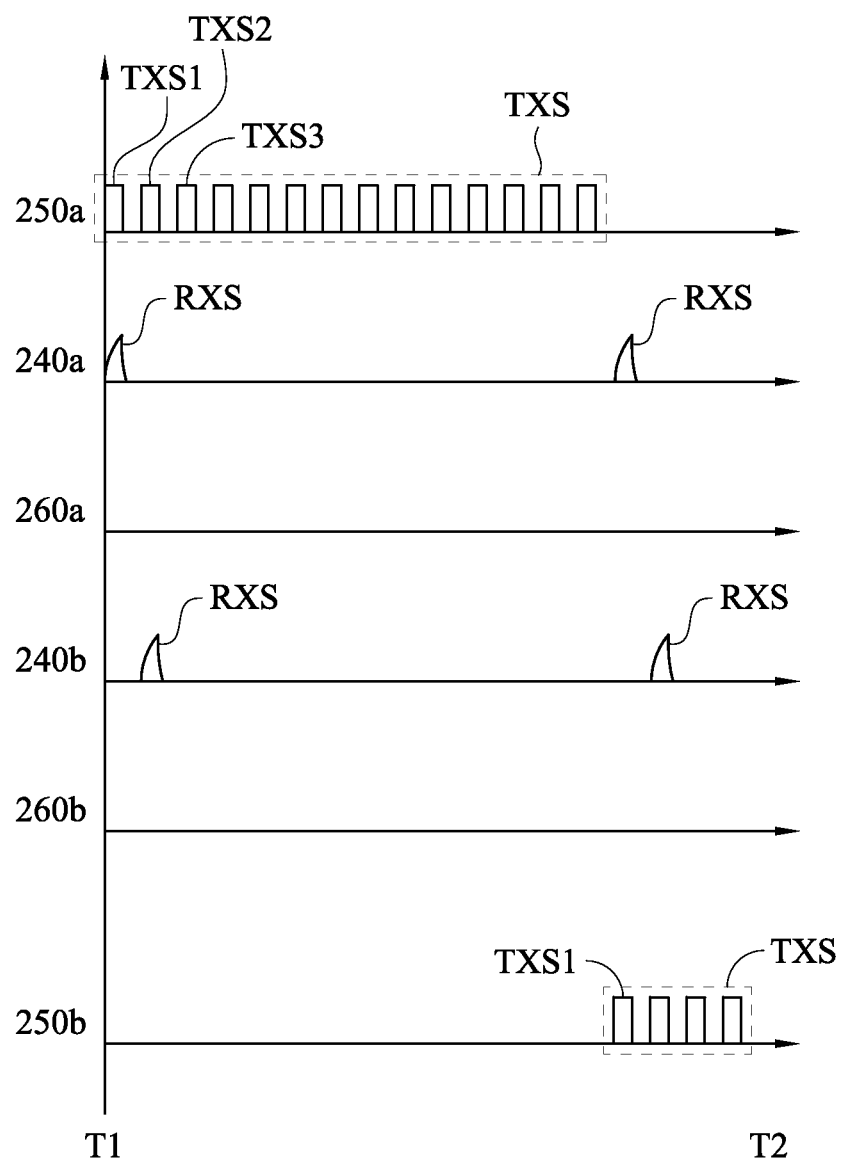
FIG. 6 is a signal diagram of the transmitter electrodes, the receiver electrodes, and the common electrodes of FIG. 2 in a time domain between T1 and T1 in FIG. 5.

Reference is now made to both FIG. 2 and FIG. 6, in which FIG. 6 is a signal diagram of the transmitter electrodes, the receiver electrodes, and the common electrodes of FIG. 2 at the time between T1 and T2 of FIG. 5. In any particular time domain, the signal driver 270 provides the transmitting touch signals TXS to the transmitter electrodes 250a and a ground potential to the transmitter electrodes 250b. The transmitting touch signals TXS includes plural pulse signals TXS1, TXS2, TXS3, etc. When the pulse signal TXS1 is transmitted to the transmitter electrodes 250a, the signal driver 270 provides a ground potential to the receiver electrodes 240b and detects the signal of the receiver electrodes 240a. The switch 295 disconnects the electrical connection between the common electrodes 260a and the common potential providing unit 290, while the common potential providing unit 290 provides the common potential Vcom to the common electrodes 260b. Therefore, the transmitter electrodes 250a have an electromagnetic force produced by the pulse signal TXS1, and the electromagnetic force can pass through the common potential 260a. At this time the signal driver 270 can detect the receiving touch signal RXS at the receiver electrodes 240a, and the receiving touch signal RXS is generated from the coupling capacitances between the transmitter electrodes 250a and the receiver electrodes 240a.

Next, the pulse signal TXS is transmitted to the transmitter electrodes 250a, so that the signal driver 270 provides the ground potential to the ground electrodes 240a and detects the signal of the receiver electrodes 240b. The switch 295 disconnects the electrical connection between the common electrodes 260a, 260b and the common potential providing unit 290. Therefore, the transmitter electrodes 250a have an electromagnetic force produced by the pulse signal TXS2, and the electromagnetic force can pass through the common potential 260a and 260b. At this time the signal driver 270 can detect the receiving touch signal RXS at the receiver electrodes 240b, and the receiving touch signal RXS is generated from the coupling capacitances between the transmitter electrodes 250a and the receiver electrodes 240b.

If the stereoscopic touch panel 200 further includes other receiver electrodes, the signal driver 270 can be configured for providing the pulse signals TXS3, etc., to the transmitter electrodes 250a according to the above steps and detecting the signals of the receiver electrodes. The switch 295 is configured for disconnecting the electrical connection between the common electrodes and the common potential providing unit 290, in which the common electrodes are at two sides of the receiver electrodes detecting the receiving touch signals RXS. As for the receiver electrodes that do not detecting the receiving touch signals RXS, the receiver electrodes and other common electrodes are all kept at the ground potential.

Figure 7A:
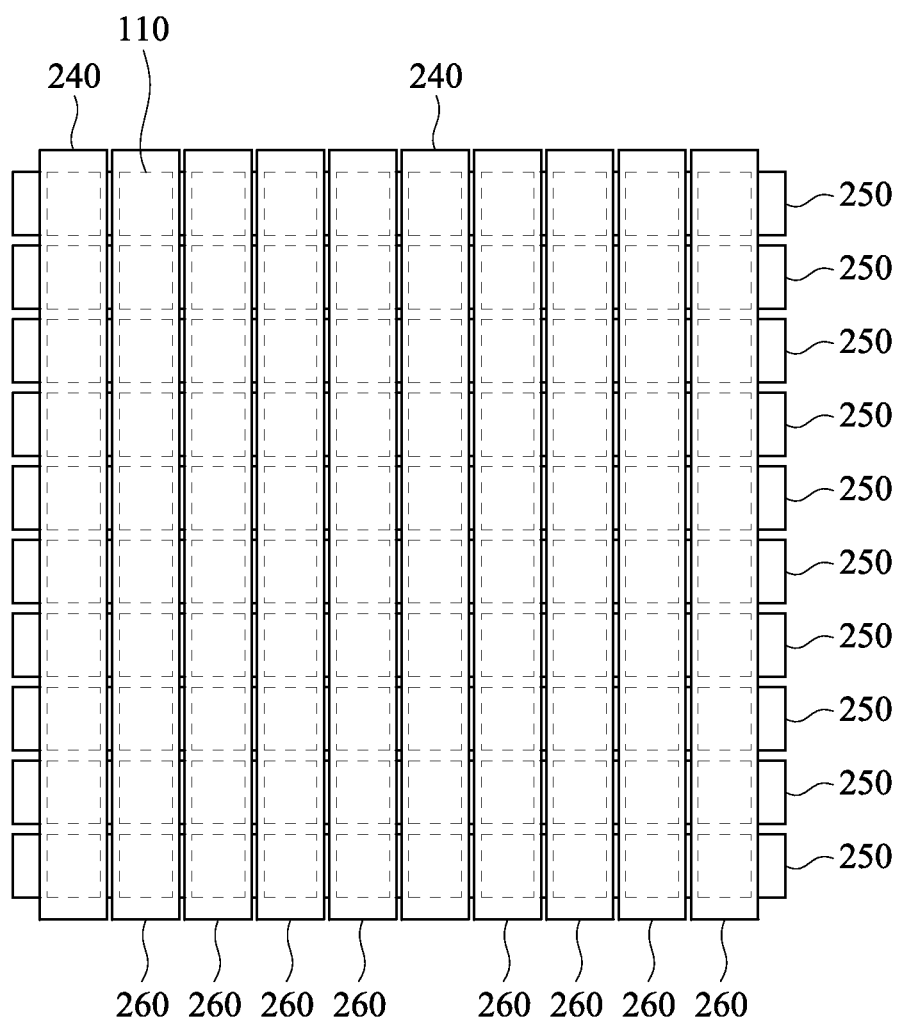
FIG. 7A is a top view of the transmitter electrodes, the receiver electrodes, the common electrodes, and pixel units of FIG. 1 according to an embodiment of this invention.

Reference is now made to FIG. 1 and FIG. 7A, in which FIG. 7A is a top view of the receiver electrodes 240, the transmitter electrodes 250, the common electrodes 260, and pixel units of FIG. 1 according to one embodiment of this invention. In this embodiment, the arrangement and the structure of the receiver electrodes 240, the transmitter electrodes 250, and the common electrodes 260 are the same as the electrodes illustrated in FIG. 2. When a viewer is viewing the stereoscopic touch display device, a line connecting the two eyes of the viewer is perpendicular to an extension direction of the transmitter electrodes 250. In this embodiment, the pixel units 110 of the display panel 100 form a pixel unit array. The receiver electrodes 240 and the common electrodes 260 produce plural orthographic projections on the display panel 100, and each of the orthographic projections is overlapped with at least one row of the pixel unit 110. For example, in FIG. 7A, each receiver electrode 240 is overlapped with a row of the pixel units 110, and each common electrode 260 is overlapped with a row of the pixel units 110. However, it should be understood that such details are not intended to limit the present invention. Based on various touch resolutions of the stereoscopic touch panel 200, each of the receiver electrode 240s and the common electrodes 260 can be overlapped with multiple rows of the pixel units 110.

In this embodiment, any two adjacent receiver electrodes 240 are spaced apart by at least one common electrode 260. For example, referring to FIG. 7A, two adjacent receiver electrodes 240 are spaced apart by four common electrodes 260. When the receiving touch signals RXS of one of the receiver electrodes 240 are detected (as shown in FIG. 2), the four common electrodes 260 disposed at two sides of the receiver electrode 240 have a floating potential F (as shown in FIG. 2). As a result, a larger space is formed for the penetration of the electromagnetic force produced by the transmitter electrodes 250, so that the four common electrodes 260 and the receiver electrodes 240 produce coupling capacitances.

In this embodiment, an orthographic projection of each of the transmitter electrodes 250 on the display panel 100 is overlapped with at least one column of the pixel units 110. For example, in FIG. 7A, each transmitter electrode 250 is overlapped with one column of the pixel units 110. Since the signal driver 270 (as shown in FIG. 2) controls the rotations of the liquid crystal molecules of the liquid crystal layer 230 through the transmitter electrodes 250, the size of the transmitter electrodes 250 may determine the resolution of the stereoscopic display. That is, the denser the distribution of the transmitter electrodes 250, the higher the stereoscopic display resolution. Referring to FIG. 2, each five of the transmitter electrodes 250a or 250b are configured for receiving the same transmitting touch signals TXS and the liquid crystal drive signals LCS in a same sequence, indicating that the touch resolution equals the stereoscopic display resolution. However, in other embodiments, the touch resolution may not be equal to the stereoscopic display resolution. For example, the touch resolution can be higher than the stereoscopic display resolution. This can be achieved by designing the signals provided by signal driver 270 to the transmitter electrodes 250 respectively, depending on the actual situation.

In this embodiment, the transmitter electrodes 250 are arranged alternatingly with the receiver electrodes 240. For instance, in FIG. 7A, the transmitter electrodes 250 are orthogonal to the receiver electrodes 240, but such a configuration is not intended to limit the present invention. In other embodiments, the transmitter electrodes 250 can be parallel to the receiver electrodes 240. Moreover, in this embodiment, the transmitter electrodes 250 and the receiver electrodes 240 are both in a strip-shaped configuration, but a wavy shape or a serrated shape is also acceptable in other embodiments for reducing the Moiré effect in the stereoscopic touch panel 200 or the Moiré effect between the stereoscopic touch panel 200 and the display panel 100.

Figure 7B:
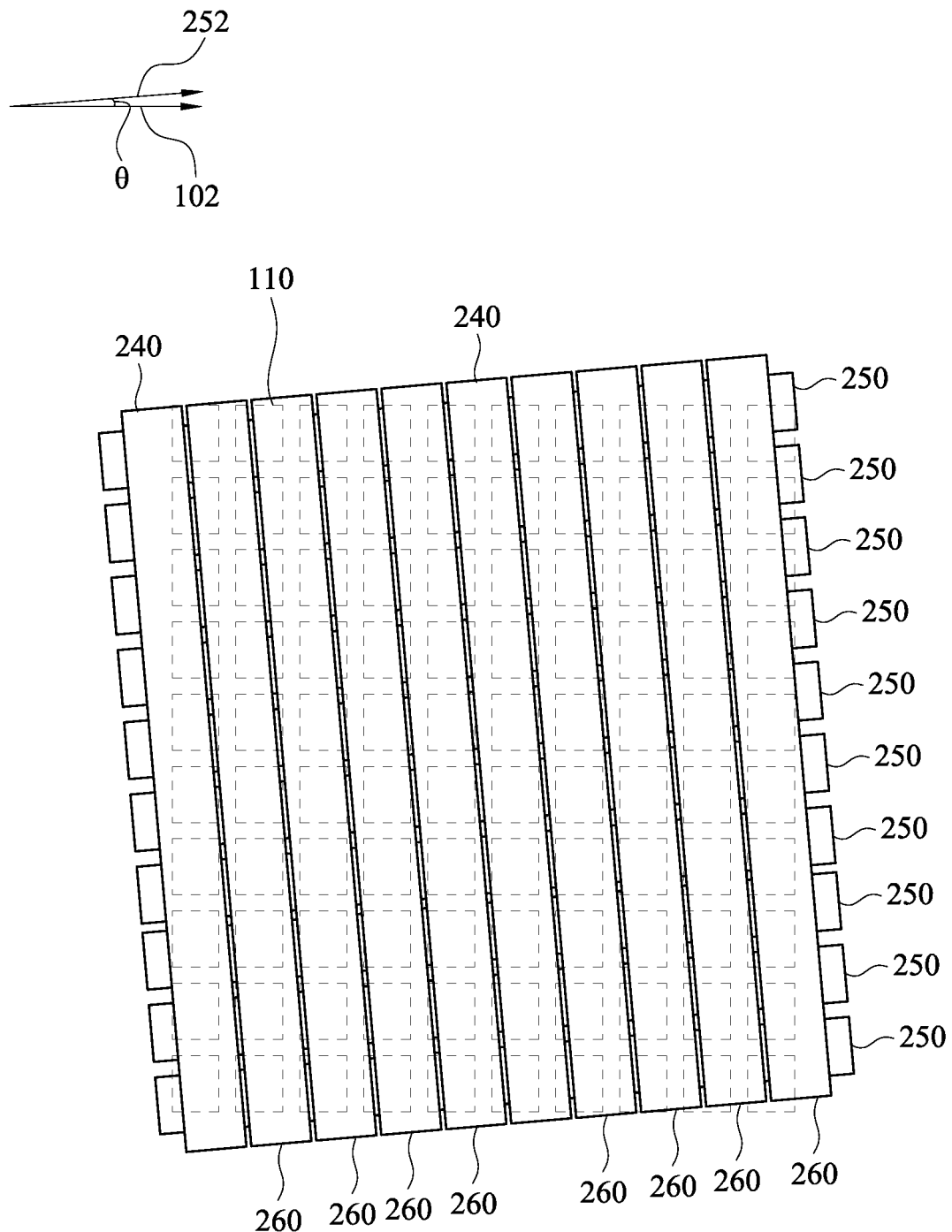
FIG. 7B is a top view of the transmitter electrodes, the receiver electrodes, the common electrodes, and the pixel units of FIG. 1 according to another embodiment of this invention.

FIG. 7B is a top view of the receiver electrodes 240, the transmitter electrodes 250, the common electrodes 260, and the pixel units of FIG. 1 according to another embodiment of this invention. In this embodiment, the arrangement and the structure of the receiver electrodes 240, the transmitter electrodes 250, and the common electrodes 260 are the same as the electrodes illustrated in FIG. 2. The difference between this embodiment and the embodiment of FIG. 7A relates to a relative displacement between the transmitter electrodes 250 and the pixel units 110. In this embodiment, the pixel units 110 are at least arranged along a first direction 102, and the transmitter electrodes 250 all have an extension direction 252. An angle between the first direction 102 and the extension direction 252 is larger than zero degrees. However, such details are not intended to limit the present invention. Therefore, through such a configuration, the Moiré effect generated between the stereoscopic touch panel 200 and the display panel 100 can be reduced.

Figure 8:
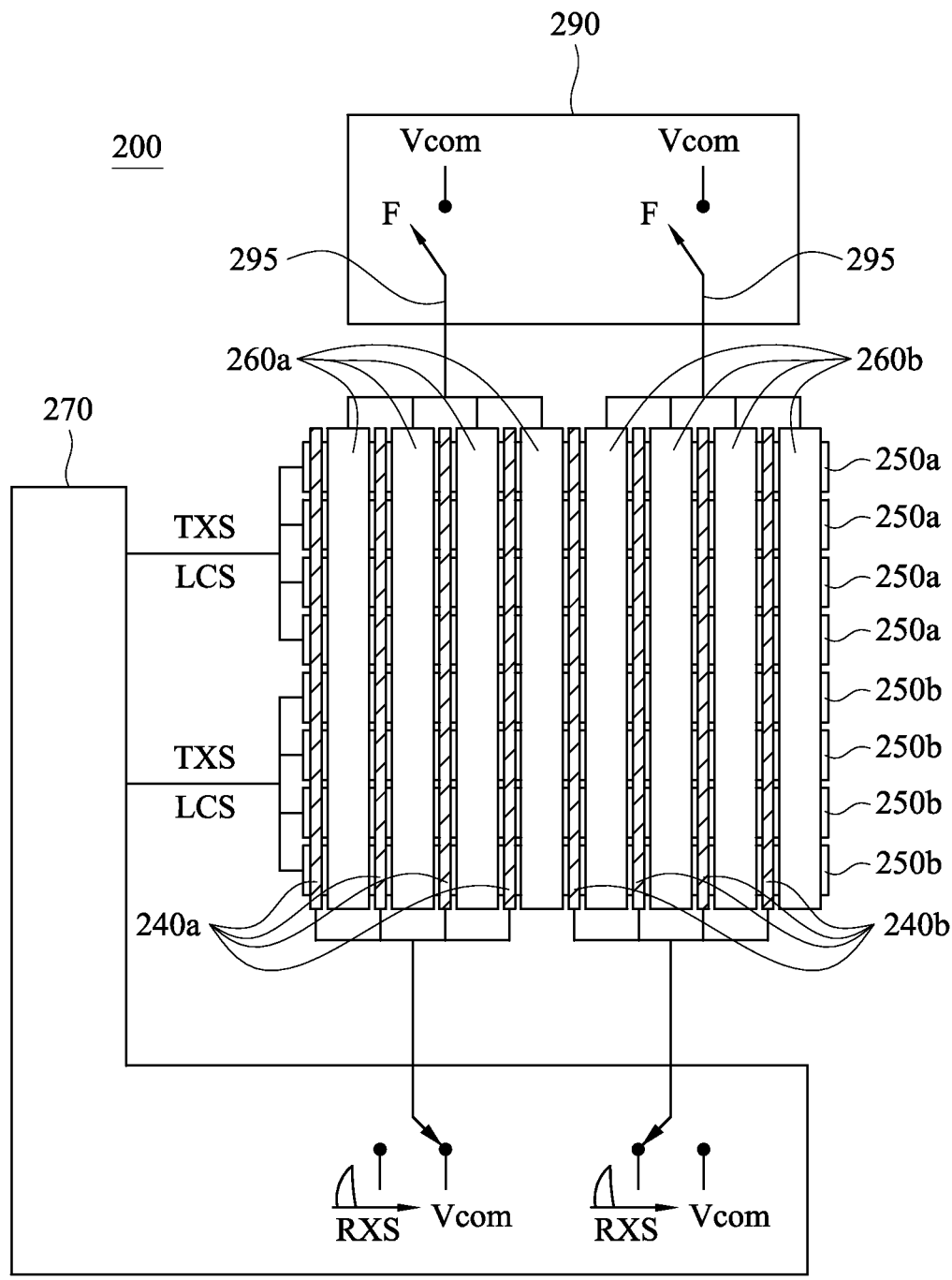
FIG. 8 is a top view of a stereoscopic touch panel of FIG. 1 in one of the time domains according to another embodiment of this invention.

FIG. 8 is a top view of the stereoscopic touch panel 200 of FIG. 1 in a time domain according to another embodiment of this invention. The difference between this embodiment and the embodiment of FIG. 2 is the arrangement of the receiver electrodes and the common electrodes, and the connection between the transmitter electrodes and the signal driver 270. In this embodiment, the receiver electrodes 240a and the common electrodes 260a are arranged alternatingly, and the receiver electrodes 240b and the common electrodes 260b are arranged alternatingly. As a result, when the stereoscopic touch panel 200 is in the stereoscopic display state, the receiver electrodes 240a, 240b and the common electrodes 260a, 260b receive the common potential Vcom. When the stereoscopic touch panel 200 is in the touch state, for example, detecting the coupling capacitances of the receiver electrodes 240b, the common electrodes 260a and 260b both have the floating potential F. As a result, the transmitting touch signals TXS of the transmitter electrodes 250a or 250b can pass through the common electrodes 260a and 260b which have the floating potential F. The signal driver 270 can detect the receiving touch signals RXS at the receiver electrodes 240b, and the receiving touch signals RXS are generated from the coupling capacitances between the receiver electrodes 240b and the transmitter electrodes 250a or 250b.

In one or more embodiment, each width of the common electrodes 260a and 260b is larger than each width of the receiver electrodes 240a and 240b. For example, a ratio of the width of the common electrodes 260a and 260b to the width of the receiver electrodes 240a and 240b is 4:1. However, such a ratio is not intended to limit the present invention. As a result, when the common electrodes 260a and/or 260b have the floating potential F, a larger space can be formed for the penetration of the electromagnetic force produced by the transmitter electrodes, so that the common electrodes 260a and/or 260b further produce the coupling capacitances with the receiver electrodes. As for the method of signal transmission in this embodiment, a discussion of the method is omitted since the method is the same as that in the embodiment of FIG. 2.

Figure 9:
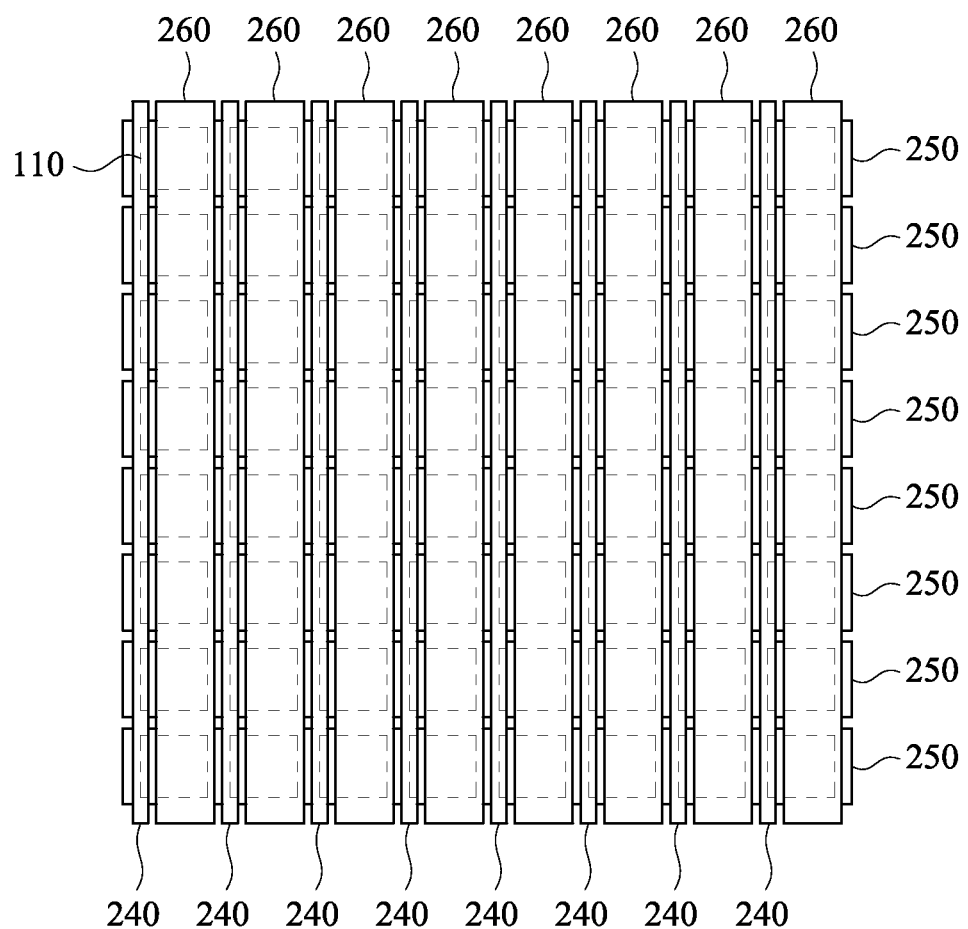
FIG. 9 is a top view of the transmitter electrodes, the receiver electrodes, the common electrodes, and the pixel units of FIG. 1 according to another embodiment of this invention.

Reference is now made to FIG. 1 and FIG. 9, in which FIG. 9 is a top view of the receiver electrodes 240, the transmitter electrodes 250, the common electrodes 260, and the pixel units of FIG. 1 according to another embodiment of this invention. In this embodiment, the arrangement and the structure of the receiver electrodes 240, the transmitter electrodes 250, and the common electrodes 260 are the same as the electrodes of FIG. 8. In this embodiment, the pixel units 110 of the display panel 100 form the pixel unit array, and two adjacent electrodes of the receiver electrodes and the common electrodes produce the orthographic projections on the display panel 100. Moreover, the orthographic projections are overlapped with one row of the pixel units 110. For example, in FIG. 9, each of the receiver electrodes 240 and each of the adjacent common electrodes are overlapping with one row of the pixel units 110. Additionally, in this embodiment, an orthographic projection of each of the transmitter electrodes 250 on the display panel 100 is overlapped with at least one column of the pixel units 110. For example, in FIG. 9, each of the transmitter electrodes 250 is overlapping with one column of the pixel units 110. Other details in this embodiment are omitted since aspects thereof are the same as those in the embodiment of FIG. 7.

Reference is now made back to FIG. 1. In this embodiment, the receiver electrodes 240 and the common electrodes 260 are disposed between the first substrate 210 and the liquid crystal layer 230. The transmitter electrodes 250 are disposed between the second substrate 220 and the liquid crystal layer 230. Therefore, in the stereoscopic display state, an electric field can be created between the receiver electrodes 240, the common electrodes 260, and the transmitter electrodes 250 for controlling the rotation of the liquid crystal molecules of the liquid crystal layer 230.

Additionally, the stereoscopic touch panel 200 includes a sealant 310 disposed between the first substrate 210 and the second substrate 220. The sealant 310 surrounds the liquid crystal layer 230 for preventing the leakage of the liquid crystal molecules of the liquid crystal layer 230. In one or more embodiment, the stereoscopic touch panel 200 further includes an insulating layer 320 disposed between the transmitter electrodes 250 and the second substrate 220, but such a configuration is not intended to limit the scope of this invention.

Figure 10:
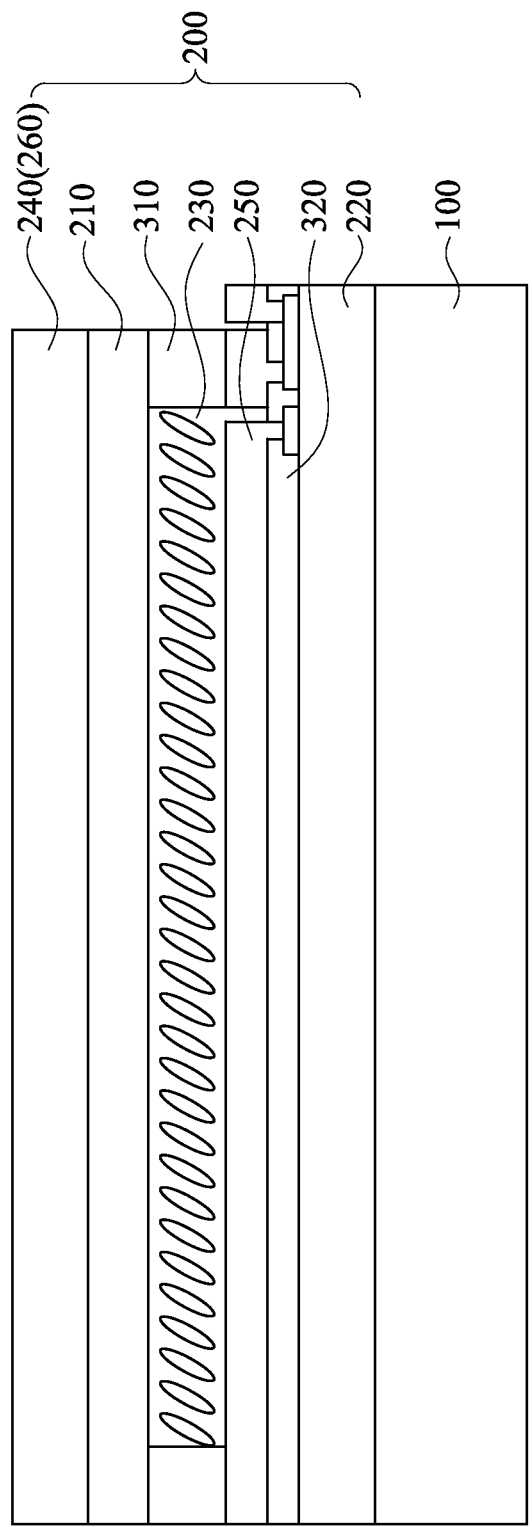
FIG. 10 is a cross-sectional view of a stereoscopic touch display device according to a second embodiment of this invention.

The structure of the stereoscopic touch panel 200 is not limited to the structure illustrated in FIG. 1. FIG. 10 is a cross-sectional view of a stereoscopic touch display device according to a second embodiment of this invention. As shown in this figure, the receiver electrodes 240 and the common electrodes 260 can be disposed at one side of the first substrate 210 facing the liquid crystal layer 230, so that the receiver electrodes 240 are placed closer to the signal source for enhancing the quality of touch action. Other details of this embodiment are substantially the same as those of the first embodiment.

Figure 11:
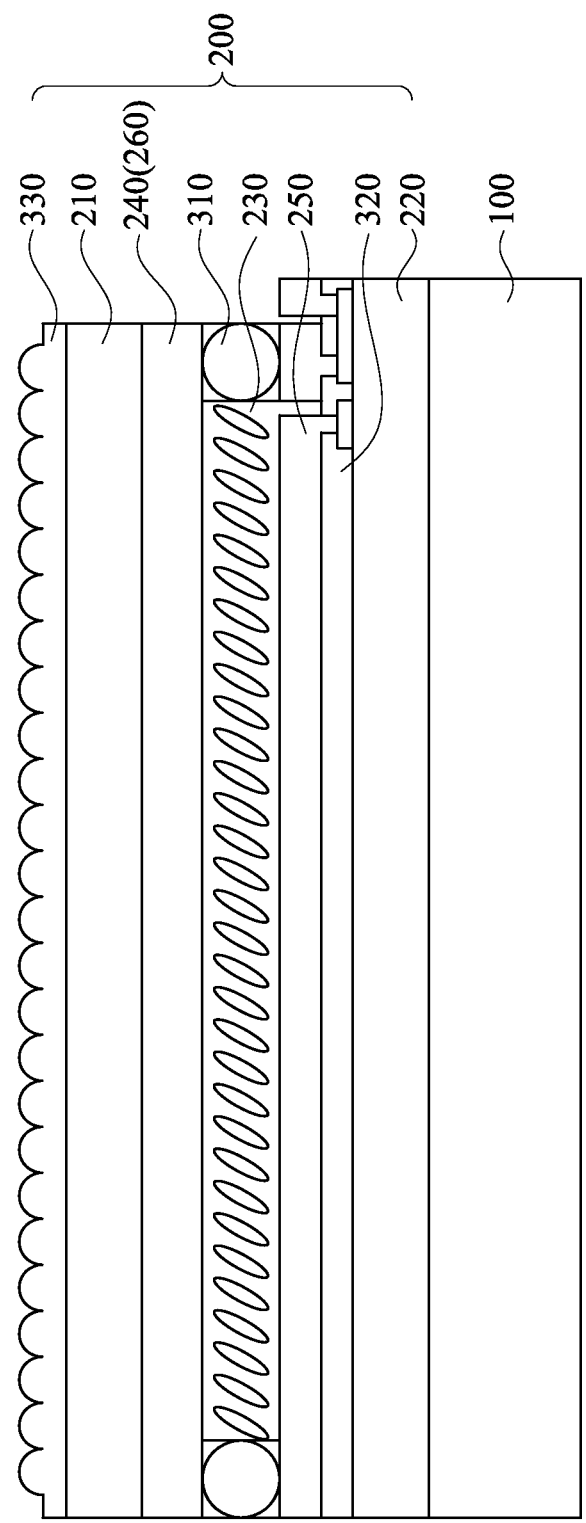
FIG. 11 is a cross-sectional view of a stereoscopic touch display device according to a third embodiment of this invention.

FIG. 11 is a cross-sectional view of the stereoscopic touch display device according to a third embodiment of this invention. The difference between this embodiment and the first embodiment is the existence of a cylindrical lens 330 in this embodiment. In this embodiment, the structure of the stereoscopic touch panel 200 further includes the cylindrical lens 330, and the first substrate 210 is disposed between the cylindrical lens 330 and the liquid crystal layer 230. The cylindrical lens 330 also includes plural liquid crystal molecules. More particularly, when the light provided by the display panel 100 passes through the liquid crystal layer 230 of the stereoscopic touch panel 200, the liquid crystal molecules of the liquid crystal layer 230 are rotated to adjust the polarization state of the light depending on whether 3D or 2D display is being performed. As a result, after the light passes through the liquid crystal layer 230 and arrives at the cylindrical lens 330, light with different polarization states has different refractive angles because of the cylindrical lens 330, so that 2D or 3D images can be produced.

Figure 12:
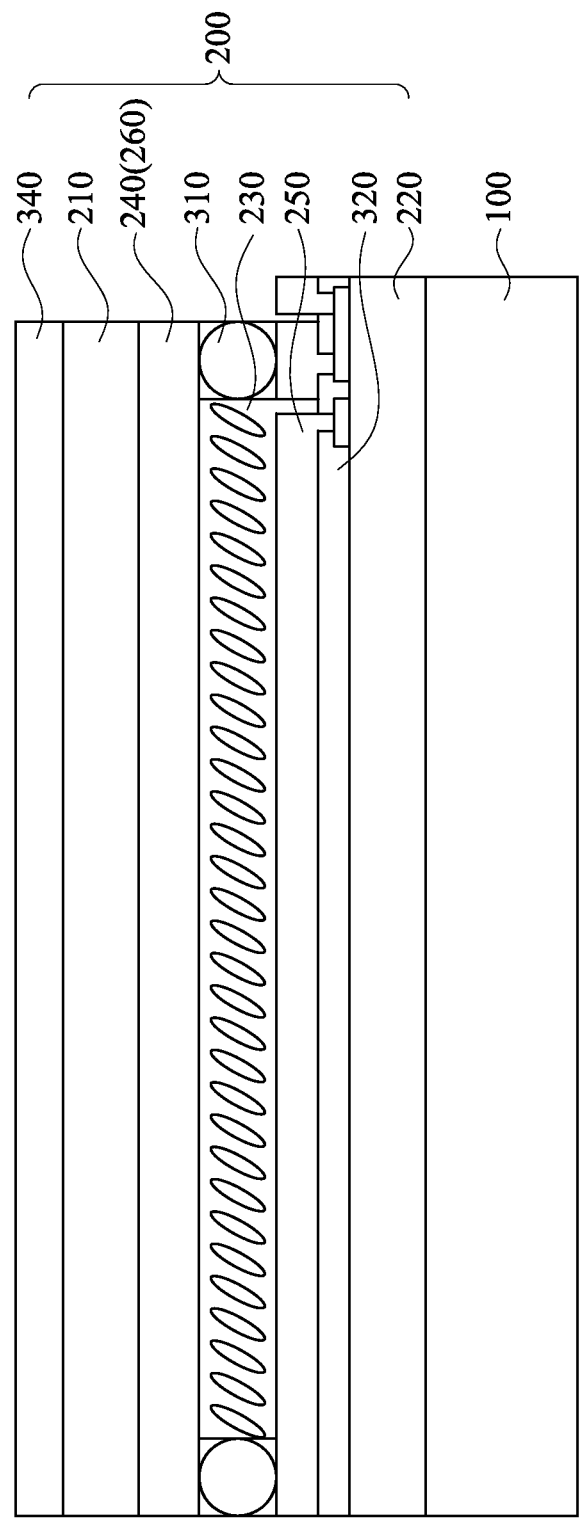
FIG. 12 is a cross-sectional view of a stereoscopic touch display device according to a fourth embodiment of this invention.
Figure 13:
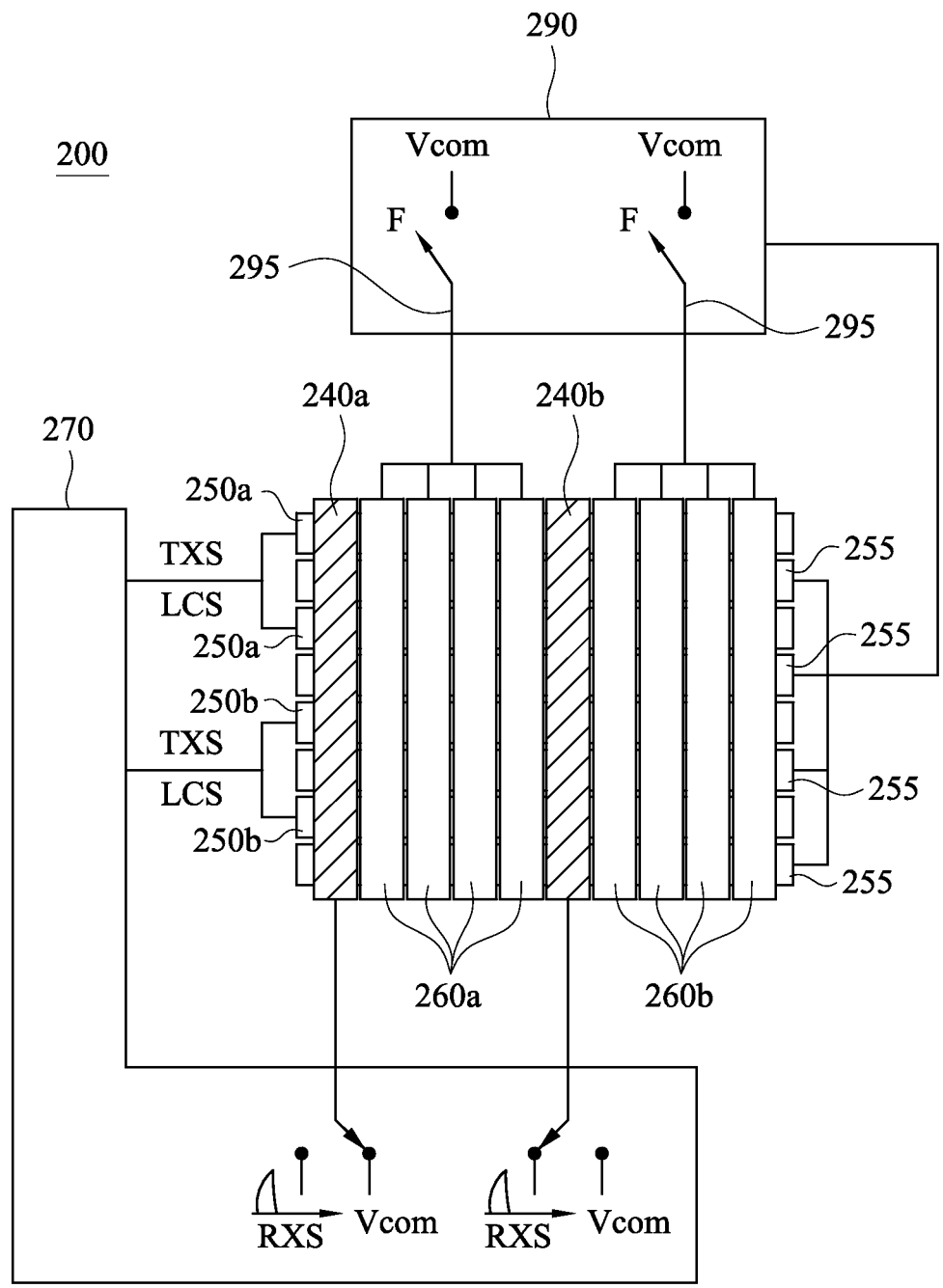
FIG. 13 is a top view of a stereoscopic touch panel of FIG. 12 in one of the time domains according to an embodiment of this invention.

Reference is now made to the FIG. 12 and FIG. 13. FIG. 12 is a cross-sectional view of the stereoscopic touch display device according to a fourth embodiment of this invention. FIG. 13 is a top view of the stereoscopic touch panel 200 of FIG. 12 in a time domain according to one embodiment of this invention. The difference between this embodiment and the first embodiment is related to the manner in which stereoscopic display is realized by the stereoscopic touch panel 200. Unlike the liquid crystal lens method used in the first embodiment and the second embodiment, in this embodiment, the stereoscopic display method of the stereoscopic touch panel 200 may be the parallax barrier method. More particularly, in FIG. 13, in this embodiment, the common potential providing unit 290 is used for providing the common potential Vcom to at least one portion of the transmitter electrodes. For example, referring to FIG. 13, the common potential providing unit 290 provides the common potential Vcom to the transmitter electrodes 255, in which the transmitter electrodes 255 transmitting the common potential Vcom are arranged alternatingly with the transmitter electrodes 255a and/or 250b transmitting the liquid crystal drive signals LCS. Therefore, when the stereoscopic touch panel 200 is in the state of stereoscopic display, the common potential providing unit 290 provides the common potential Vcom to the transmitter electrodes 255. The signals of the transmitter electrodes 255a and 250b are the same as the signals of FIG. 3, and the signals of the receiver electrodes 250a, 240b and the common electrodes 260a, 260b are the same as the signals of FIG. 6. The stereoscopic touch panel 200 can further include a polarizer 340, and the first substrate 210 is disposed between the polarizer 340 and the liquid crystal layer 230. In addition, the relative positions and sizes of the respective electrodes and the pixel units 110 (as shown in FIG. 7A) are the same as those of FIG. 7A.

Figure 14:
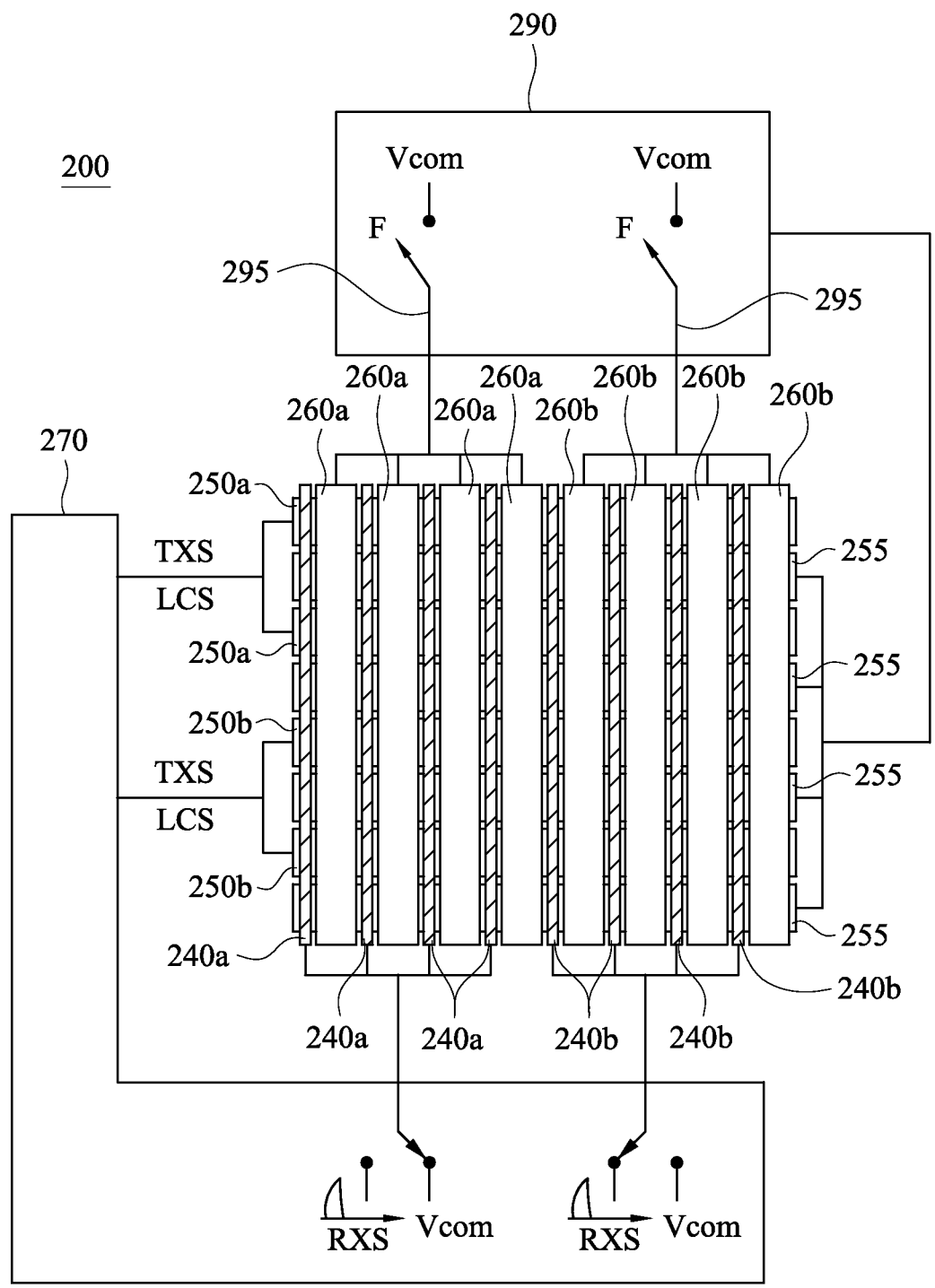
FIG. 14 is a top view of the stereoscopic touch panel of FIG. 12 in one of the time domains according to another embodiment of this invention.

FIG. 14 is a top view of the stereoscopic touch panel 200 of FIG. 12 in a time domain according to another embodiment of this invention. The differences between this embodiment and the embodiment illustrated in FIG. 13 are the arrangement of the receiver electrodes and the common electrodes, and the connection between the transmitter electrodes and the signal driver 270. In this embodiment, the receiver electrodes and the common electrodes are arranged alternatingly. For example, referring to FIG. 14, the receiver electrodes 240a and the common electrodes 260a are arranged alternatingly, and the receiver electrodes 240b and the common electrodes 260b are arranged alternatingly. Therefore, when the stereoscopic touch panel 200 is in a state of performing stereoscopic display, the receiver electrodes 240a, 240b and the common electrodes 260a, 260b receive the common potential Vcom. When the stereoscopic touch panel 200 is in the touch state, for instance, detecting the receiving touch signals RXS of the receiver electrodes 240b, the common electrodes 260a and 260b both have the floating potential F, which enables the transmitting touch signals TXS of the transmitter electrodes 250a or 250b to pass through the common electrodes 260a and 260b with the floating potential F. As a result, the signal driver 270 can detect the receiving touch signals RXS at the receiver electrodes 240b, and the receiving touch signals RXS are generated from the coupling capacitances between the receiver electrodes 240b and the transmitter electrodes 250a or 250b. Other details in this embodiment are the same as those found in the embodiment of FIG. 13. In addition, the relative positions and sizes of the respective electrodes and the pixel units 110 (as shown in FIG. 9) are the same as illustrated in FIG. 9.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A stereoscopic touch display device, comprising:
a display panel comprising a plurality of pixel units; and
a stereoscopic touch panel, comprising:
   a first substrate;
   a second substrate disposed opposite to the first substrate;
   a liquid crystal layer disposed between the first substrate and the second substrate, the liquid crystal layer comprising a plurality of liquid crystal molecules;
   a plurality of receiver electrodes disposed on the first substrate;
   a plurality of transmitter electrodes disposed on the second substrate;
   a plurality of common electrodes disposed on the first substrate;
   a signal driver electrically connected to the transmitter electrodes and the receiver electrodes, wherein the signal driver is configured for providing a plurality of transmitting touch signals to at least one portion of the transmitter electrodes, and detecting a plurality of receiving touch signals generated from a plurality of coupling capacitances between the receiver electrodes and at least one portion of the transmitter electrodes in sequence, wherein each of the transmitting touch signals is configured so as to be unable to trigger the liquid crystal molecules of the liquid crystal layer; and a common potential providing unit for providing a common potential to at least one portion of the common electrodes.

2. The stereoscopic touch display device of claim 1, wherein each of the transmitting touch signals comprises a frequency, and the frequency is sufficiently high to prevent the liquid crystal molecules of the liquid crystal layer from being triggered by a potential variation caused by each of the transmitting touch signals.

3. The stereoscopic touch display device of claim 1, wherein the signal driver is further used to provide a plurality of liquid crystal drive signals to at least one portion of the transmitter electrodes for controlling rotations of the liquid crystal molecules of the liquid crystal layer, so that a plurality of images produced by the pixel units are guided respectively to a plurality of fields of views.

4. The stereoscopic touch display device of claim 3, wherein a frequency of each of the transmitting touch signals is higher than a frequency of each of the liquid crystal drive signals.

5. The stereoscopic touch display device of claim 3, wherein the common potential providing unit is further used to provide the common potential to at least a portion of the transmitter electrodes, wherein the transmitter electrodes used for transmitting the common potential and the transmitter electrodes used for transmitting the liquid crystal drive signals are arranged alternatingly.

6. The stereoscopic touch display device of claim 1, wherein the common electrodes and the receiver electrodes are arranged alternatingly.

7. The stereoscopic touch display device of claim 1, wherein the stereoscopic touch panel further comprises:

a switch for disconnecting the electrical connection between the common electrodes at two sides of the receiver electrodes having the receiving touch signals and the common potential providing unit when detecting at least one of the receiving touch signals of the receiving electrodes, so that the common electrodes have a floating potential.

8. The stereoscopic touch display device of claim 1, wherein each width of the common electrodes is greater than each width of the receiver electrodes.

9. The stereoscopic touch display device of claim 1, wherein any two adjacent electrodes of the receiver electrodes are spaced apart by at least one of the common electrodes.

10. The stereoscopic touch display device of claim 1, wherein a pixel unit array is formed from the pixel units, and the common electrodes have a plurality of orthographic projections on the display panel, wherein each of the orthographic projections is overlapped with at least one row of the pixel units.

11. The stereoscopic touch display device of claim 1, wherein a pixel unit array is formed from the pixel units, and the receiver electrodes have a plurality of orthographic projections on the display panel, wherein each of the orthographic projections is overlapped with at least one row of the pixel units.

12. The stereoscopic touch display device of claim 1, wherein a pixel unit array is formed from the pixel units, and the two adjacent electrodes, which are the receiver electrode and the common electrode, produce a plurality of orthographic projections on the display panel, wherein the orthographic projections are overlapped with one row of the pixel units.

13. The stereoscopic touch display device of claim 1, wherein a pixel unit array is formed from the pixel units, and the transmitter electrodes have a plurality of orthographic projections on the display panel, wherein each of the orthographic projections is overlapped with one column of the pixel units.

14. The stereoscopic touch display device of claim 1, wherein the transmitter electrodes are alternatingly arranged with the receiver electrodes.

15. The stereoscopic touch display device of claim 1, wherein the pixel units are arranged along a first direction, and each of the transmitter electrodes has an extending direction, wherein an angle between the first direction and the extending direction is equal to or greater than 0 degrees.

16. The stereoscopic touch display device of claim 1, wherein the receiver electrodes are disposed between the first substrate and the liquid crystal layer.

17. The stereoscopic touch display device of claim 1, wherein the stereoscopic touch panel further comprises a polarizer, and the first substrate is disposed between the polarizer and the liquid crystal layer.

18. The stereoscopic touch display device of claim 1, wherein the stereoscopic touch panel further comprises a cylindrical lens, and the first substrate is disposed between the cylindrical lens and the liquid crystal layer.

19. The stereoscopic touch display device of claim 1, wherein the receiver electrodes are disposed on one side of the first substrate facing the liquid crystal layer.

* * * * *